(12) United States Patent
Yip

(10) Patent No.: US 10,083,628 B2
(45) Date of Patent: Sep. 25, 2018

(54) SYSTEMS AND METHODS FOR A DYNAMIC BRAILLE DISPLAY

(71) Applicant: John Gilbert Yip, Seattle, WA (US)

(72) Inventor: John Gilbert Yip, Seattle, WA (US)

(\*) Notice: Subject to any disclaimer, the term of this patent is extended or adjusted under 35 U.S.C. 154(b) by 748 days.

(21) Appl. No.: 14/590,030

(22) Filed: Jan. 6, 2015

(65) Prior Publication Data

US 2015/0206453 A1 Jul. 23, 2015

Related U.S. Application Data

(60) Provisional application No. 61/930,066, filed on Jan. 22, 2014.

(51) Int. Cl.
*G09B 21/00* (2006.01)

(52) U.S. Cl.
CPC .......... *G09B 21/004* (2013.01); *G09B 21/00* (2013.01); *G09B 21/003* (2013.01); *G09B 21/002* (2013.01)

(58) Field of Classification Search
USPC ....................................................... 434/113
See application file for complete search history.

(56) References Cited

U.S. PATENT DOCUMENTS

| | | |
|---|---|---|
| 3,659,354 A | 5/1972 | Sutherland |
| 4,079,825 A | 3/1978 | Fewell |
| 5,772,440 A | 6/1998 | Ida |
| 6,692,255 B2 | 2/2004 | Roberts et al. |
| 6,700,553 B2 | 3/2004 | Becker et al. |
| 6,734,785 B2 | 5/2004 | Petersen |
| 6,819,228 B2 | 7/2004 | Gipson et al. |
| 6,987,467 B2 | 1/2006 | Romeo et al. |
| 7,009,595 B2 | 3/2006 | Roberts et al. |
| 8,602,786 B2 | 1/2013 | Takahashi et al. |
| 2011/0269106 A1* | 11/2011 | Schroeder ............ G09B 21/004 434/113 |
| 2012/0214139 A1 | 8/2012 | Murphy et al. |
| 2013/0011816 A1 | 1/2013 | Minnich et al. |

\* cited by examiner

*Primary Examiner* — James Hull
(74) *Attorney, Agent, or Firm* — Pierson IP, PLLC

(57) ABSTRACT

Embodiments disclosed herein describe systems and methods for a tactile braille display that reduces the number of actuators used to position movable pins. In embodiments, the actuators may be configured to move a plurality of movable pins at different times while also being configured to move independent movable pins.

16 Claims, 30 Drawing Sheets

SYSTEMS AND METHODS FOR A DYNAMIC BRAILLE DISPLAY

CROSS-REFERENCE TO RELATED APPLICATIONS

This application claims a benefit of priority under 35 U.S.C. § 119 to Provisional Application No. 61/930,066 filed on Jan. 22, 2014, which is fully incorporated herein by reference in its entirety.

BACKGROUND INFORMATION

Field of the Disclosure

Examples of the present disclosure are related to systems and methods for a dynamic, refreshable braille character display. More particularly, embodiments relate to a braille character display with independent movable pins that are moved via a write head interfacing with the movable pins.

Background

Braille was created to enable the visually impaired to read characters on printed materials. Conventional braille includes a set of character symbols within a matrix with a plurality of rows and columns. However, conventional printed braille materials, such as books and magazines, are expensive and of limited availability.

Conventional tactile braille displays are configured to raise and lower a moveable pin above a plane of reference, such that the change of state from a lowered state to an elevated state may be physically detectable via the sense of touch. However, conventional tactile braille displays are complex, with each moveable pin having an independent actuator, causing conventional tactile braille displays to be expensive.

Accordingly, needs exist for more effective and efficient systems and methods for a tactile braille display.

SUMMARY

Embodiments disclosed herein describe systems and methods for a tactile braille display. The tactile braille display may include a substrate and a positioning mechanism.

In embodiments, the substrate may be a rigid, display substrate with independent movable pins positioned within the substrate, wherein a top surface of the substrate includes a common plane. The movable pins may be positioned in the substrate, and may be configured to move from a first position to a second position. In embodiments, the first position may be lower than the second position.

The movable pins may include a first end and a second end. The first end may be a tactile raised dot configured to be touched by a user, and the second end may include a cam that is configured to interface with a write head. In embodiments, if a movable pin is in the second position, then the first end may project away from the top surface of the display substrate.

The positioning mechanism may include the write head and a plurality of rows, wherein the rows include a plurality of movable pins. The write head may include at least one actuator that is configured to interface with the second end of a movable pin, and move the movable pin from the first position to the second position or vice versa.

In embodiments, the second ends of the movable pins may include a cam. The cam may be configured to interface with the write head. Responsive to a motion of the write head perpendicular to the top surface of the substrate, the movable pin may move perpendicular to the top surface of the substrate.

To this end, the tactile braille display described herein may be an inexpensive, multi-line refreshable braille display that may enable the visually challenged to read a wealth of material available electronically. These materials may include books, webpages, office documents, etc.

The multi-line format of the tactile braille display may preserve a document's text layout and enable spatial navigation that is not possible with text-to-speech devices or single-line braille displays. For example, utilizing the tactile braille display, information may be presented in columns. Furthermore, the ability to refresh the independent, movable pins without moving other independent, movable pins may enable the use of interactive applications, such as spreadsheets and text editors.

Embodiments may be incorporated into a standalone device, wherein a user may interact directly with the device, or embodiments may be used as a display portion of multiple connected components. For example, embodiments may take the place of a computer monitor connected to a computer, or embodiments may be combined to form multi-screened displays.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
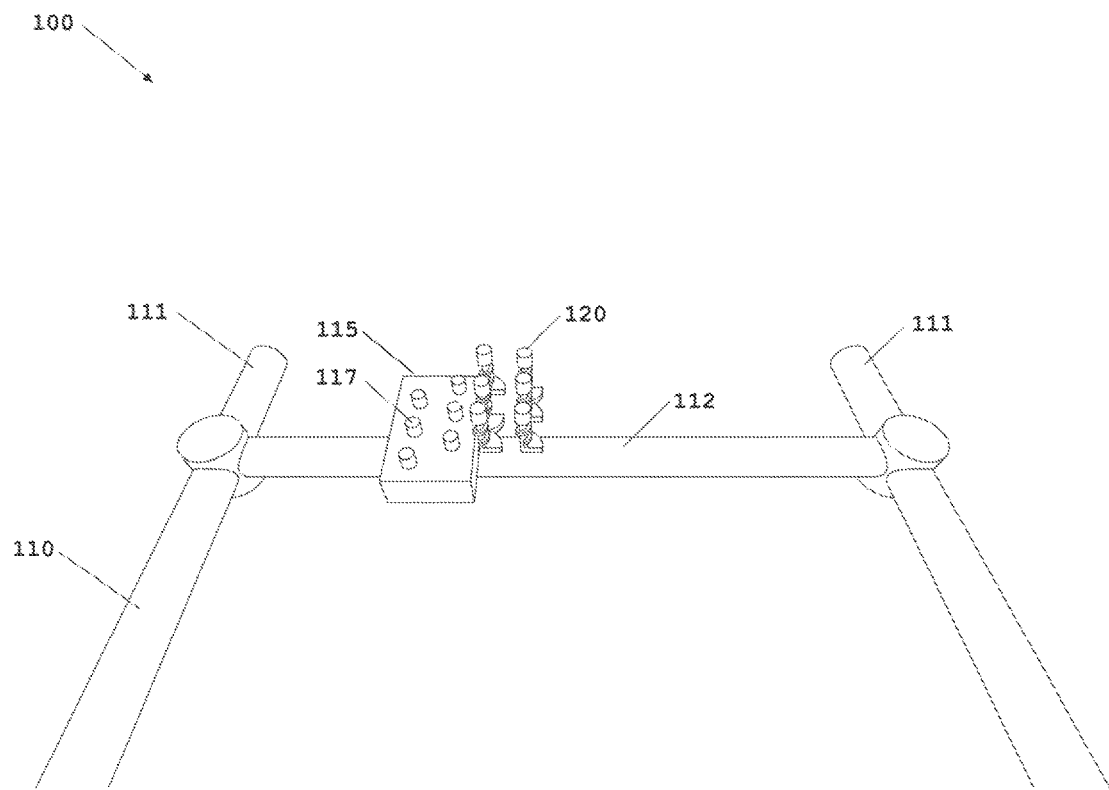
FIG. 1 depicts an embodiment of a tactile braille display.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments disclosed herein describe systems and methods for a tactile braille display that reduces the number of actuators used to position independent, movable pins. In embodiments, the actuators may be configured to move a plurality of pins at different times, while also being configured to move the movable pins individually.

FIG. 1 depicts one embodiment of a tactile braille display 100. Tactile braille display 100 may include a position assembly 110, a write head 115, a plurality of movable pins 120, and a display substrate with a common plane (not shown).

Positioning assembly 110 may be a structural system configured to support components of tactile braille display 100. In embodiments, positioning assembly 110 may include at least two columns 111 and row 112. Row 112 may be configured to move along columns 111. Responsive to row 112 moving along columns 111, write head 115 interacts with different rows of movable pins 120. The two columns 111 may be stationary or fixed rails, and row 112 may be a movable rail that is configured to move vertically along columns 111.

Write head 115 may be configured to be disposed on row 112 and be configured to move horizontally along row 112 to interface with different movable pins 120. Write head 115 may include at least one actuator 117, wherein actuator 117 may be configured to independently interface with a cam on second ends of movable pins 120 to move movable pins 120 in a direction perpendicular to the movement of write head 115. The at least one actuator 117 may be configured to be raised and/or lowered based on the character desired to be displayed by tactile braille display 100. In embodiments, the at least one actuator 117 may include pairs of actuators, wherein a first actuator of the pair may be configured to raise a movable pin 120, and a second actuator of the pair is configured to lower a movable pin 120. Furthermore, there may be a plurality of pairs of actuators configured to independently position movable pins 120.

In embodiments, write head 115 may include a processor including memory, e.g., read only memory (ROM) and random access memory (RAM), storing processor-executable instructions, and one or more processors that execute the processor-executable instructions. The processor may execute commands or software associated with the positioning of movable pins 120. In further embodiments, the processor may be a software driver that is configured to perform a plurality of operations, commands, or tasks. For example, the processor may be configured to transform electronic characters or other document elements to a desired signal to correspondingly position the actuators 117 of write head 115, and/or to determine selective refreshing of a portion of tactile braille display 100, such as during scrolling, text editing, spreadsheet editing, etc. The processor may be configured to provide a range of optimization for an electronic device or computer data for the display of information on tactile display 100. For example, the processor may be configured to display a selection of text from an electronic document source on tactile display 100, determine spacing, word wrap, other layout parameters, choice of braille representation (i.e. grade 1, grade 2, 8-dot, etc.), translation between languages, etc.

Write head 115 may also include a communication device that allows write head 115 to receive commands from other devices over a network to position movable pins 120. The communication device may include one or more wireless transceivers for performing wireless communication and/or one or more communication ports for performing wired communication. In embodiments, responsive to the communication device receiving commands to position actuators 117, the processing device may move actuators 117.

The communication device may be configured to be an interface between write head 115 and a computer or other electronic information device, such as a host. The communication device may be configured to transmit data for display from the computer to write head 115, or to transmit data associated with user's input or actions from tactile display 100 to the computer.

Movable pins 120 may be configured to be independently raised and/or lowered via actuators 117. Movable pins 120 may be configured to move from a first position to a second position. If movable pins 120 are in the first position, the first end of movable pins 120 may be parallel or coplanar to the top surface of the display substrate. If movable pins 120 are in the second position, the first end of the movable pins 120 may project away from a top surface of the display substrate, such that a user may touch a first end of movable pins 120.

In embodiments, each movable pin 120 may also include a second end. In embodiments, the second end of movable pin 120 may include a cam that is configured to interface with actuator 117 of write head 115. The cam may be a projection, extension, or any other device that is positioned on the second end of movable pin 120 that is configured to receive force from actuator 117 of write head 115 to move movable pins 120. Responsive to write head 115 moving perpendicular to the top surface of the display substrate and the positioning of actuator 117, movable pin 120 may move in a direction perpendicular to the top surface of the display substrate. In embodiments, movable pins 120 may be configured in different modules, where a set of movable pins 120 may include a six pin display representing a single braille character.

In embodiments, tactile display 100 may be configured to move write head 115 in a raster scan pattern, where write head 115 is sequentially moved horizontally along each row of tactile display 100. Therefore, actuators 117 may collectively engage the cams of any desired movable pin 120. By sequentially moving write head 115 along each row of tactile display 100 and positioning actuators 117 as desired, movable pins 120 may be made to selectively protrude beyond the top surface of the display substrate with the resulting raised dots forming braille characters.

Figure 2:
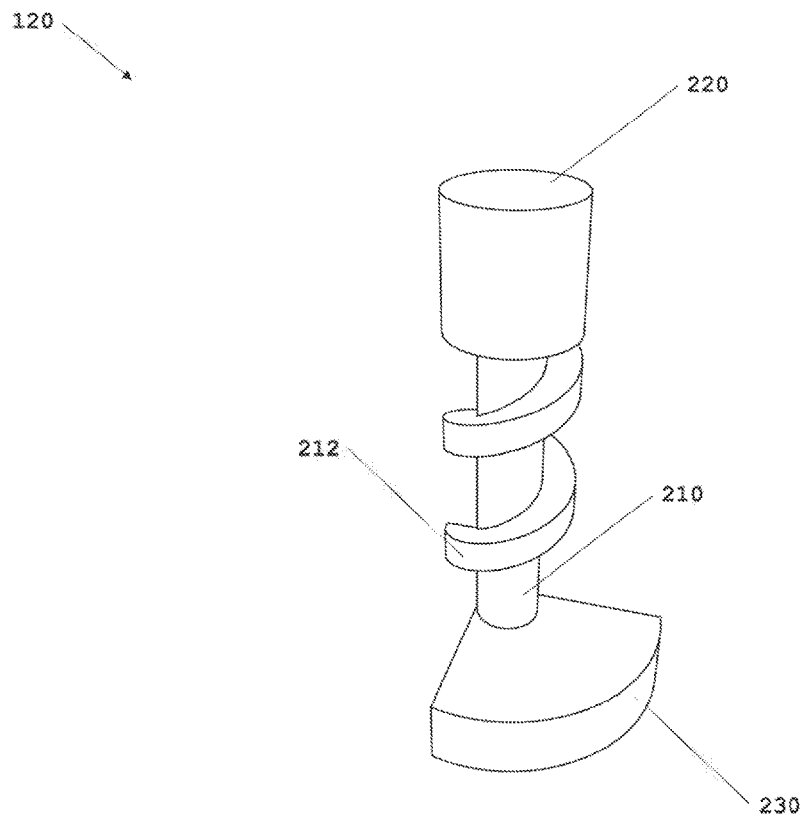
FIG. 2 depicts an embodiment of a movable pin.

FIG. 2 depicts one embodiment of a movable pin 120. Movable pin 120 may be comprised of any rigid or solid material, and movable pin 120 may include shaft 210, first end 220, and second end 230.

Shaft 210 may be configured to be embedded within the display substrate, and shaft 210 may be configured to constrain the motion of movable pin 120 to a helical path. In at least one embodiment, shaft 210 may include a helical projection 212 configured to project away from shaft 210 to control the movement of movable pin 120. Helical projection 212 may be configured to allow movable pin 120 to move in a direction perpendicular to the top surface of the display substrate while shaft 210 rotates around an axis.

First end 220 may be positioned on a first end of shaft 210. In a first position, first end 220 may be configured to be coplanar with the top surface of the display substrate. In a second position, first end 220 may be configured to project away from the display substrate, and may be shaped to be touched by a user.

Second end 230 may be positioned on a second end of shaft 210. Second end 230 may include a cam configured to be engaged by a write head. Responsive to second end 230 receiving force from the write head, the cam of second end 230 may generate torque on shaft 210 causing movable pin 120 to be raised and/or lowered.

Figure 3:
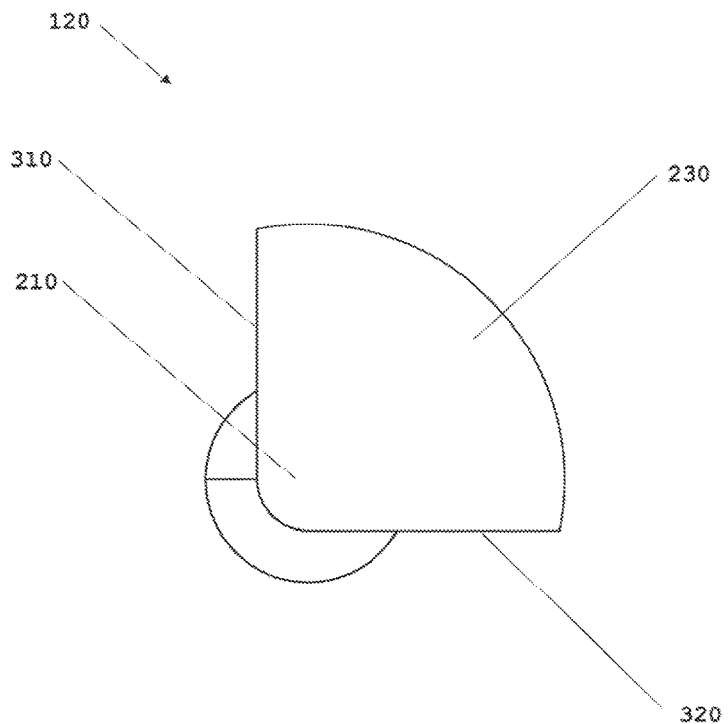
FIG. 3 depicts an embodiment of a top view of a movable pin.

FIG. 3 depicts one embodiment of a top view of movable pin 120. As depicted in FIG. 3, second end 230 may extend away from shaft 210, and second end 230 may include at least two faces 310 and 320. Faces 310 and 320 may be configured to engage with actuators to raise and lower shaft 210 within a display substrate. In embodiments, first face 310 may be configured to engage with a first actuator to move shaft 210 in a first direction, and second face 320 may be configured to engage with a second actuator to move shaft 210 in a second direction. In embodiments, responsive to first face 310 engaging with the first actuator, movable pin 120 may move from the second position to the first position, and responsive to second face 320 engaging with the second actuator, movable pin 120 may move from the first position to the second position.

Figure 4:
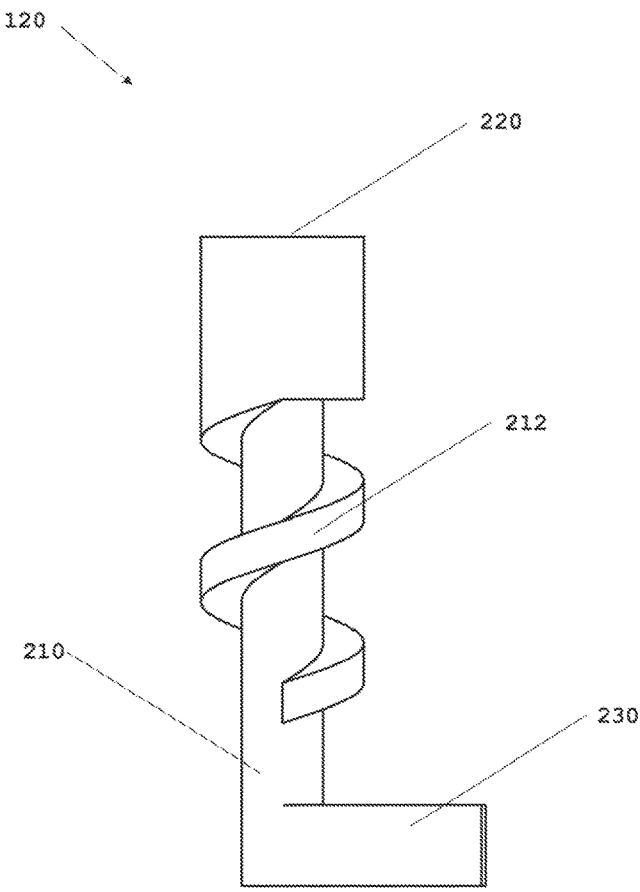
FIG. 4 depicts an embodiment of a side view of a movable pin.

FIG. 4 depicts one embodiment of a side view of movable pin 120. As depicted in FIG. 4, helical thread 212 may project away from shaft 210 and may include at least a full revolution around shaft 210.

Figure 5:
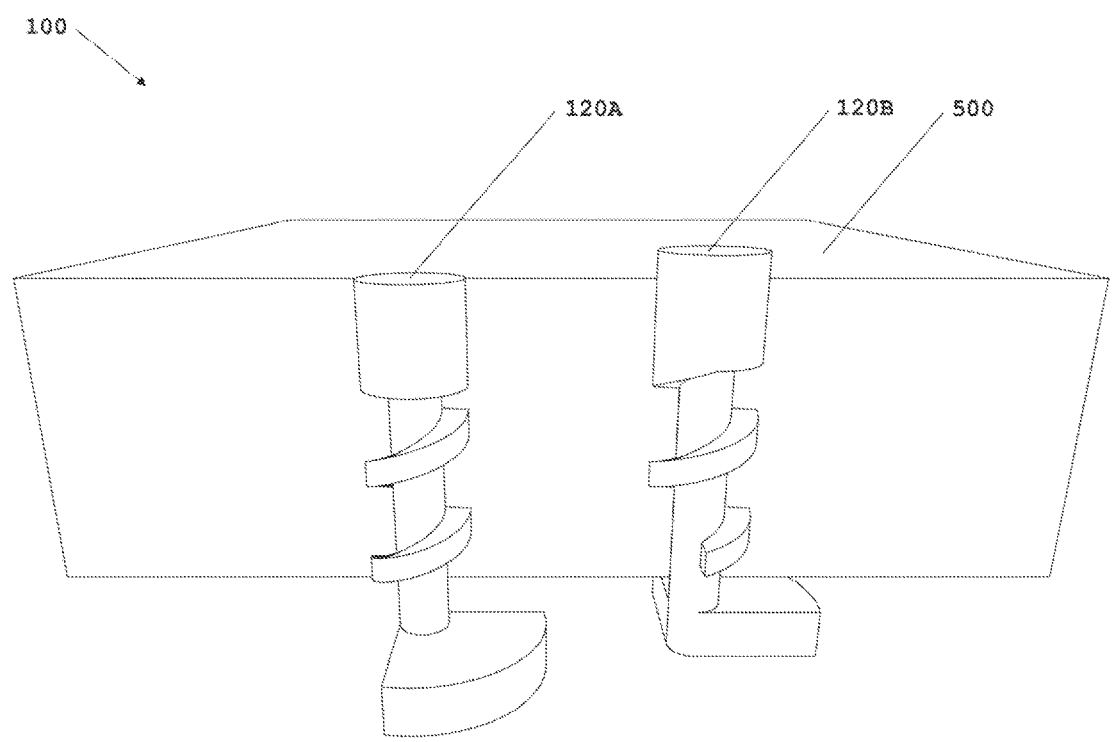
FIG. 5 depicts an embodiment of a cross section of a tactile braille display with a plurality of movable pins.

FIG. 5 depicts one embodiment of a cross section of a tactile braille display 100 with a plurality of movable pins 120A and 120B being disposed within display substrate 500.

Display substrate 500 may be a sheet of pliant or elastic material, wherein movable pins 120 may be embedded. Display substrate may be configured to maintain the relative positions of movable pins 120 within display substrate 500, such that a plurality of movable pins 120 may be positioned to represent a braille character. Display substrate 500 may also be configured to provide friction that maintains movable pins 120 in a first or second position in the presence of a user applying force on the pin while reading the movable pins 120.

As depicted in FIG. 5, movable pin 120A may be in a first or lowered position, and movable pin 120B may be in a second or raised position. Because movable pin 120A is in the first position, the first end of movable pin 120A may be coplanar to the top surface of display substrate 500. Because movable pin 120B is in the second position, the first end of movable pin 120B may project away from the top surface of display substrate 500. By arranging a plurality of movable pins in either the first position and/or second position, a braille character may be represented by the projections of the movable pins 120 disposed within display substrate 500.

Figure 6:
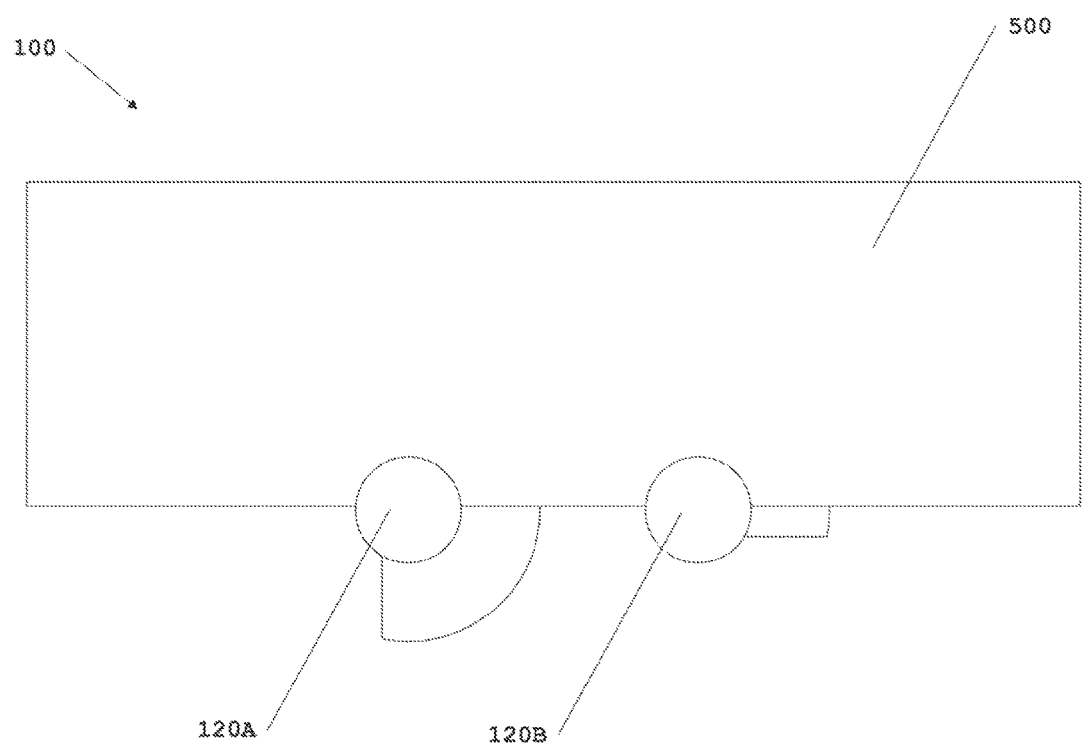
FIG. 6 depicts an embodiment of top view of a cross section of a tactile braille display with a plurality of movable pins.

FIG. 6 depicts one embodiment of top view of a cross section of a tactile braille display 100 with a plurality of movable pins 120A and 120B being disposed within display substrate 500.

As depicted in FIG. 6, the cam on the second end of movable pin 120B may be rotated. Responsive to rotating the second end of movable pin 120B, movable pin 120B may move from the first position to the second position. The cam of movable pin 120B may be moved responsive to engaging the second face 320 of movable pin 120B with an actuator. In embodiments, the cam on the second end of movable pin 120A may have been rotated by a second actuator engaging with a first face 310 of the cam on the second end of movable pin 120A. Responsive to the second actuator engaging with the first face of the cam on the second end of movable pin 120A, movable pin 120A may have been rotated from the second position to the first position.

Figure 7:
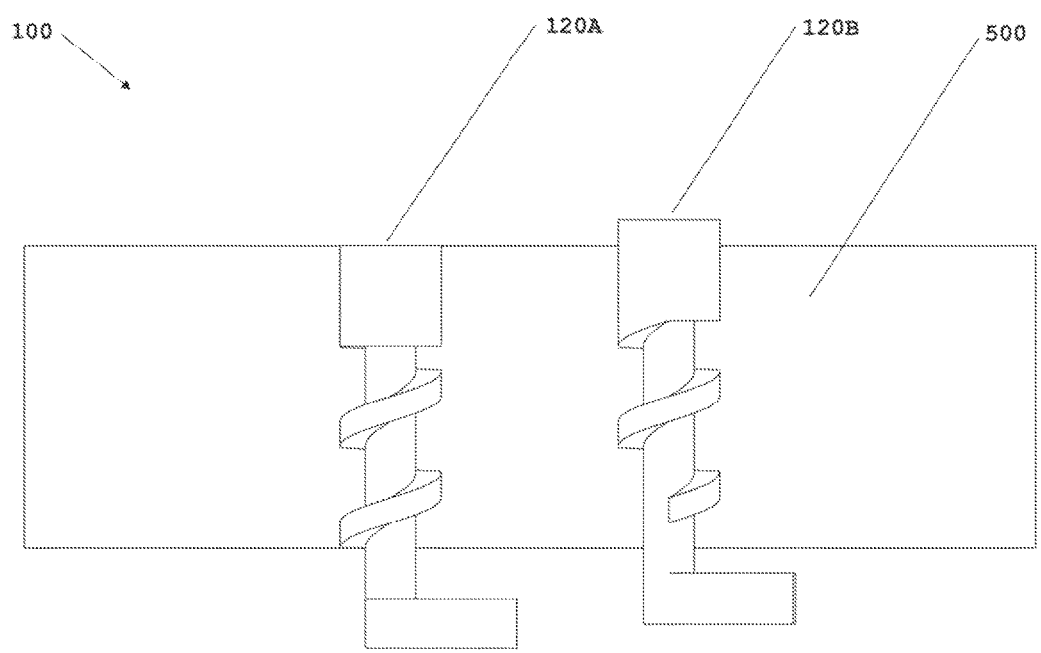
FIG. 7 depicts an embodiment of a side view of a cross section of a tactile braille display with a plurality of movable pins.

FIG. 7 depicts one embodiment of a side view of a cross section of a tactile braille display 100 with a plurality of movable pins 120A and 120B being disposed within display substrate 500.

As depicted in FIG. 7, if movable pin 120A is in the first position, then the first end of movable pin 120A may be flush, coplanar, or parallel to top surface of display substrate 500. If movable pin 120B is in the second position then the first end of movable pin 120B may project away or be raised from a top surface of display substrate 500.

Figure 8:
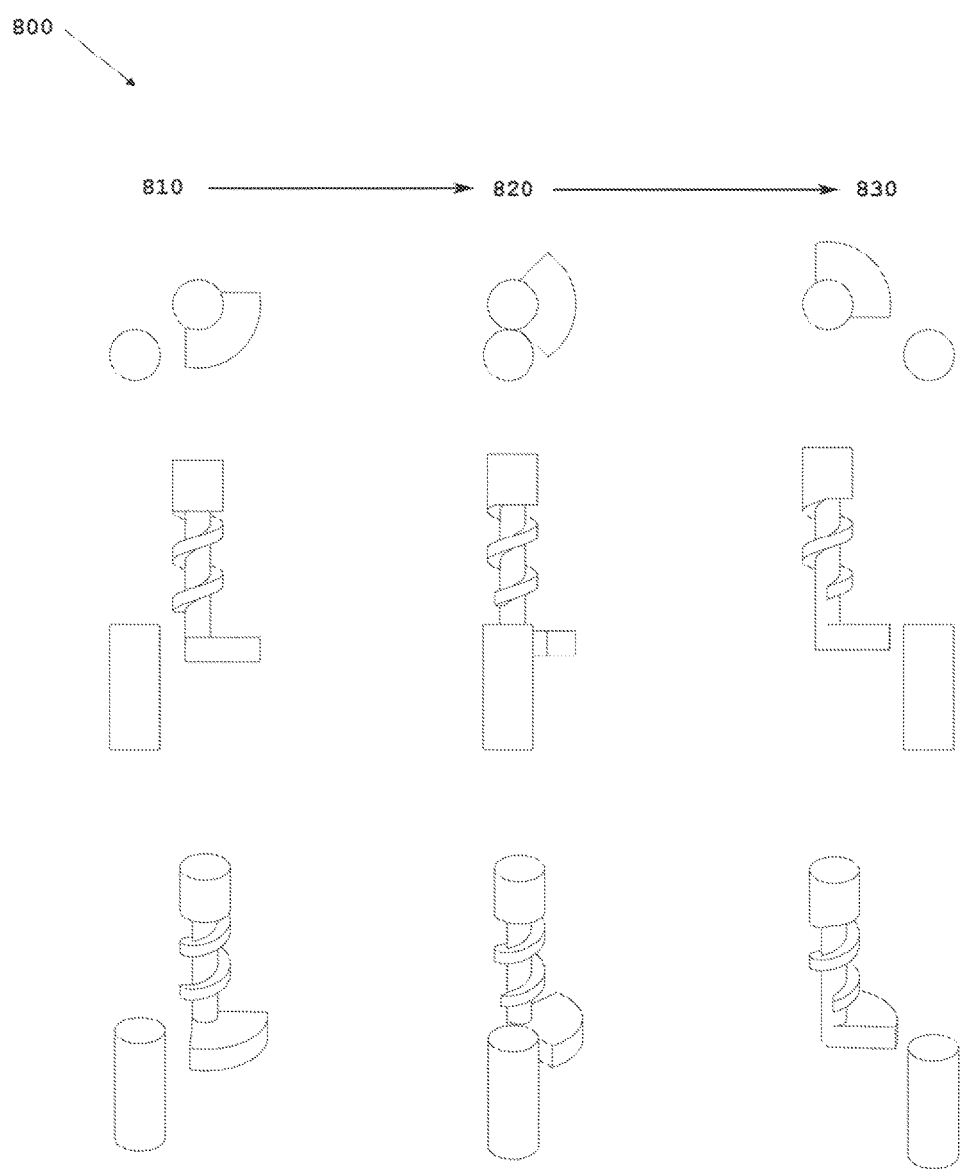
FIG. 8 depicts an embodiment of a method for positioning a movable pin within a substrate.

FIG. 8 illustrates a method 800 for positioning a movable pin within a substrate. Depicted within FIG. 8 are a movable pin and an actuator positioned on a write head. Responsive to the write head being moved, a movable pin may convert the motion of the write head to a motion of the movable pin. The movable pin may move in a direction that is perpendicular to the motion of the write head. The operations of method 800 presented below are intended to be illustrative. In some embodiments, method 800 may be accomplished with one or more additional operations not described, and/or without one or more of the operations discussed. Additionally, the order, wherein the operations of method 800 are illustrated in FIG. 8 and described below is not intended to be limiting.

At operation 810, a movable pin may be in the first or lowered position, and the write head may be moving in a horizontal direction from left to right. At operation 810, the actuator of the write head may not yet be engaged with the movable pin. Operation 810 may be performed by a write head and a movable pin that are the same as or similar to write head 115 and movable pin 120, respectively.

At operation 820, the actuator of the write head may have engaged with the cam on the second end of the movable pin. Responsive to the actuator of the write head engaging with the cam on the second end of the movable pin, the write head may exert a force on the movable pin. The force exerted on the movable pin may provide torque on the shaft of the movable pin causing the movable pin to rotate. The provided torque may cause the movable pin to rotate on an axis within a display substrate. The rotation may cause a helical thread of the movable pin to exert a force on the display substrate along the axis of the shaft of the movable pin. Responsive to the helical thread exerting the force on the display substrate, the exerted force may cause a first end of the moveable pin to move from a position flush with the top surface of the display substrate to a position projecting away from the top surface of the display substrate. Operation 820 may be performed by a write head and a movable pin that are the same as or similar to write head 115 and movable pin 120, respectively.

At operation 830, the actuator of write head 115 may no longer be in contact with the movable pin. The cam of the movable pin may have completed a rotation, which in embodiments may be a ninety degree rotation, and the movable pin may be in a second or raised position. Operation 830 may be performed by a movable pin that is the same as or similar to movable pin 120.

Figure 9:
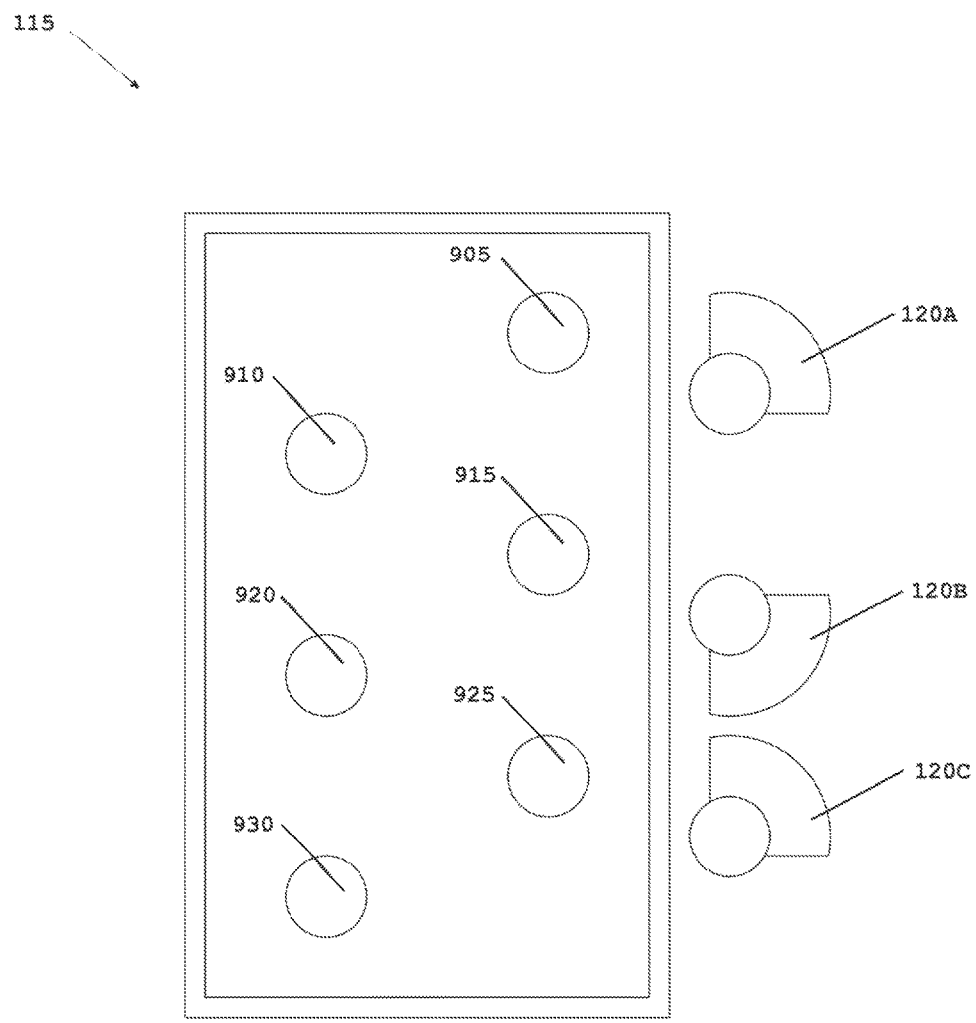
FIG. 9 depicts an embodiment of a top view of a write head with a plurality of actuators.

FIG. 9 depicts one embodiment of top view of a write head 115 with a plurality of actuators 905, 910, 915, 920, 925, 930 and a plurality of movable pins 120A, 120B, and 120C.

As depicted in FIG. 9, write head may include six actuators 905, 910, 915, 920, 925, 930, which are represented as cylinders. Each actuator 905, 910, 915, 920, 925, 930 may be configured to move linearly along its axis to be extended from or retracted within write head 115. If an actuator 905, 910, 915, 920, 925, 930 is in the extended position, actuator 905, 910, 915, 920, 925, 930 may be configured to engage the cam of movable pin 120A, 120B, or 120C. If actuator 905, 910, 915, 920, 925, 930 is in the retracted position, actuator 905, 910, 915, 920, 925, 930 may be configured to not contact movable pin 120A, 120B, or 120C while the write head is moving horizontally within the tactile display system. In embodiments, actuator 905, 910, 915, 920, 925, 930 may be configured to move from the retracted position to the extended position using a powered linear actuator or any other force to raise and/or lower actuator 905, 910, 915, 920, 925, 930.

In the embodiment depicted in FIG. 9, actuators 905 and 910, 915 and 920, and 925 and 930 may form pairs of actuators corresponding to a row of movable pins, such as 120A, 120B, and 120C, respectively. Responsive to the positioning of the actuators within a pair of actuators, movable pins 120A, 120B, and 120C may be raised or lowered. In FIG. 9, actuators 905, 920, and 930 may be in the extended position, and actuators 910, 915, and 925 may be in the retracted position.

Figure 10:
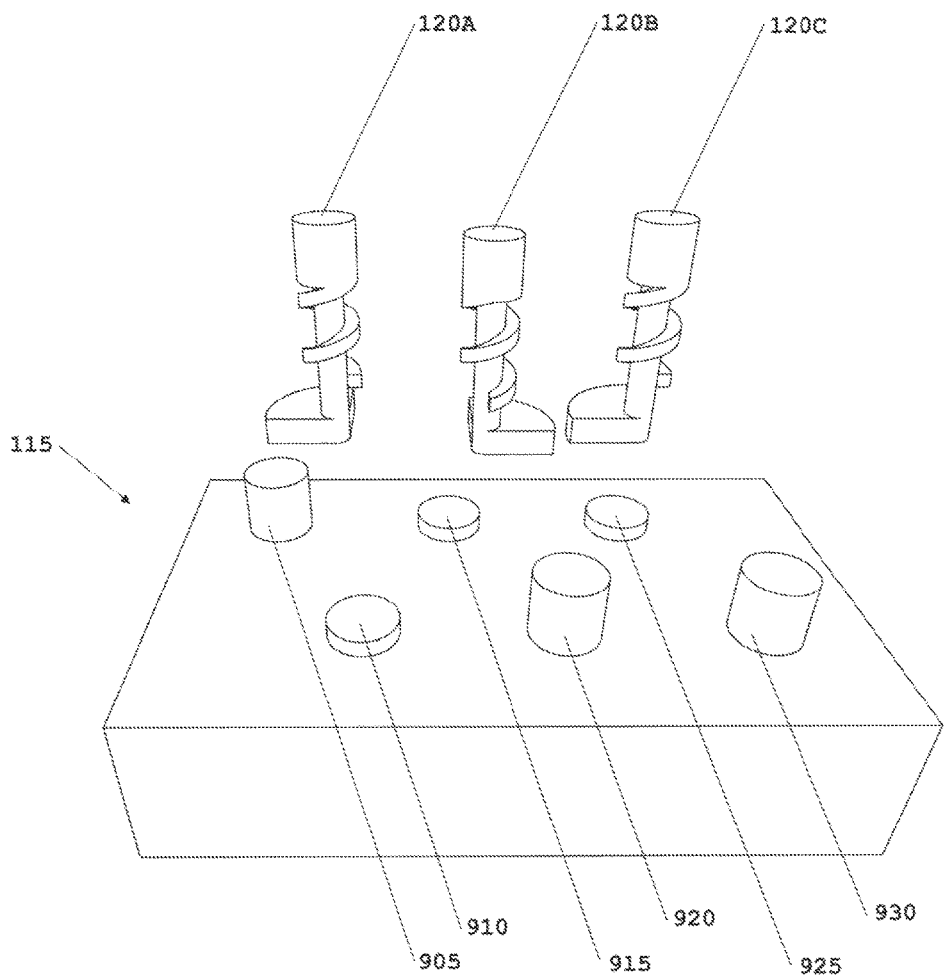
FIG. 10 depicts an embodiment of a perspective view of one embodiment of a write head.

FIG. 10 depicts a perspective view of one embodiment of write head 115. Based on the positioning of the movable pins 120A, 120B, and 120C and the positioning of actuators 905, 910, 915, 920, 925, 930, the movable pins 120A, 120B, and 120C may be independently moved from the first position to the second position, independently moved from the second position to the first position, or maintain the same position.

In FIG. 10, extended actuator 905 may engage movable pin 120A to rotate movable pin 120A in a first direction, which may be a clockwise direction. Responsive to movable pin 120A being rotated in the first directed, movable pin 120A may move from the raised position to the lowered position, wherein the movement of movable pin 120A is not correlated with the movement of another movable pin.

Extended actuator 920 may engage movable pin 120B to rotate movable pin 120B in a second direction, which may be a counter clockwise direction. Responsive to movable pin 120B being rotated in the second direction, movable pin 120B may move from the lowered position to the raised position.

Because movable pin 120C is in the raised position and the cam of movable pin 120C is rotated away from extended actuator 930, when write head 115 moves across movable pin 120C, extended actuator 930 may not engage with movable pin 120C. Therefore, movable pin 120C may remain in the raised position.

One skilled in the art will appreciate that it is not required for each of the actuators 905, 910, 915, 920, 925, 930 of write head 115 to be retractable. In embodiments, the write head 115 may be configured to operate with non-retractable actuators that position the movable pins to the lowered position. As such, a first actuator in a pair of actuators may always be configured to lower a movable pin, and the second actuator in a pair of actuators may be a retractable actuator that is configured to be extended or retracted to raise or lower the moveable pin as desired. Therefore, the actuators 905, 910, 915, 920, 925, 930 may be configured to operate in pairs to engage with movable pins to raise and lower the movable pins.

Figure 11:
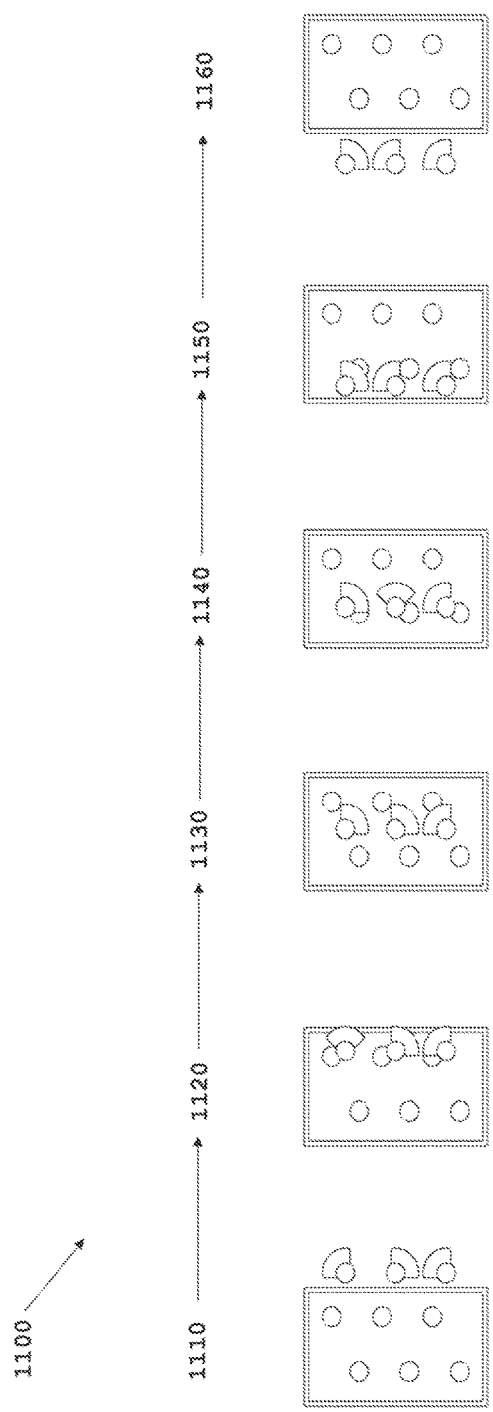
FIG. 11 depicts an embodiment of a method for pairs of actuators to position movable pins within a display substrate.

FIG. 11 illustrates a method 1100 for pairs of actuators to position movable pins within a display substrate. The operations of method 1100 presented below are intended to be illustrative. In some embodiments, method 1110 may be accomplished with one or more additional operations not described, and/or without one or more of the operations discussed. Additionally, the order, wherein the operations of method 1100 are illustrated in FIG. 11 and described below is not intended to be limiting.

At operation 1110, a write head may be moving horizontally along a row. The write head may be moving from a left position towards a right position to engage with a plurality of movable pins, wherein the left position may correspond to a left margin of a display and the right position may correspond with a right margin of a display. Operation 1110 may be performed by a write head and a movable pin that are the same as or similar to write head 115 and movable pin 120, respectively.

At operation 1120, a first actuator may engage with a first movable pin to rotate the first movable pin in a first direction, which may be clockwise. Operation 1120 may be performed by a movable pin and an actuator that are the same as or similar to movable pin 120A and actuator 905.

At operation 1130, the first actuator may have completed rotating of the first movable pin. Responsive to completing the rotation of the first movable pin, the first movable pin may move from the raised position to the lowered position. Operation 1130 may be performed by a movable pin and an actuator that are the same as or similar to movable pin 120A and actuator 905.

At operation 1140, a second actuator may engage with a second movable pin to rotate the second movable pin in a second direction, which may be counter clockwise. Operation 1140 may be performed by a movable pin and an actuator that are the same as or similar to movable pin 120B and actuator 920.

At operation 1150, the second actuator may have completed rotating the second movable pin. Responsive to completing the rotation of the second movable pin, the second movable pin may have move from the lowered position to the raised position. Operation 1150 may be performed by a movable pin and an actuator that are the same as or similar to movable pin 120B and actuator 920.

At operation 1160, the write head may have moved past the set of movable pins. Therefore, the actuators positioned on the write head may not contact any of the movable pins. Operation 1160 may be performed by a write head that is the same as or similar to write head 115.

Figure 12:
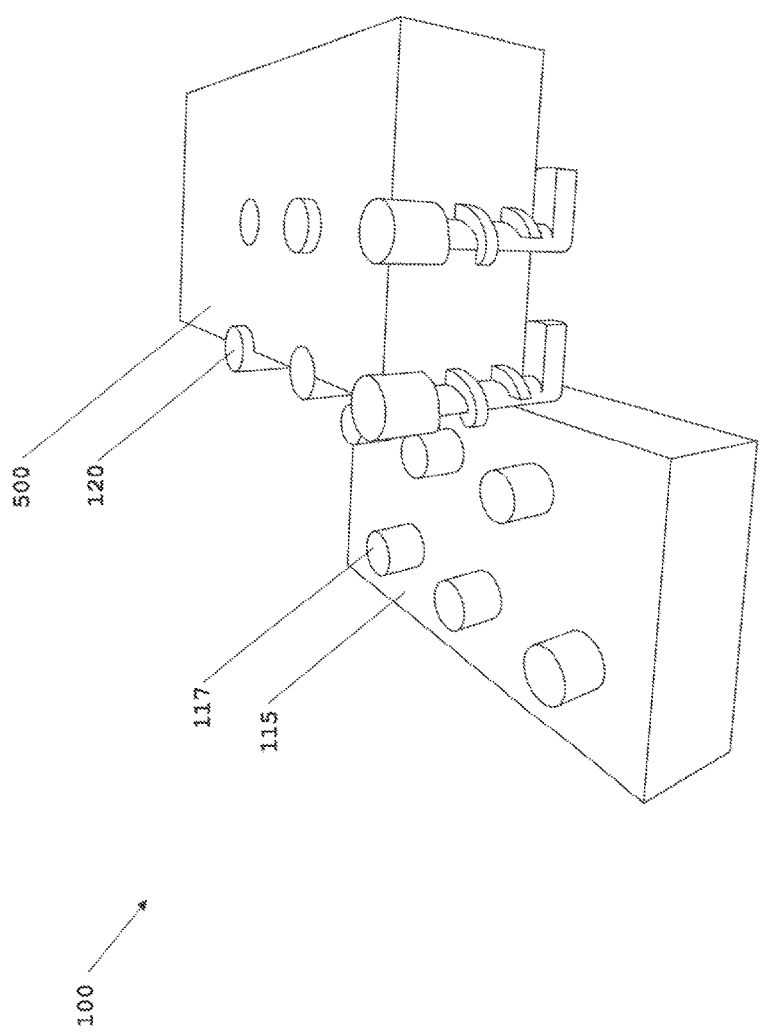
FIG. 12 depicts an embodiment of a perspective view of a plurality of movable pins projecting away from a display substrate to form a braille character.

FIG. 12 depicts one embodiment of a perspective view of a plurality of movable pins 120 projecting away from a display substrate 500 to form a braille character. A braille character may be comprised of raised dots, where the dots are a specific subset of a two by three rectangular array of dots.

In embodiments, tactile display 100 may include modules representing a braille character, where each module includes six movable pins 120. The movable pins 120 within a module representing a braille character may be positioned in two vertical columns with three rows of movable pins 120. As write head 115 moves linearly, the write head may engage with one column of a module of movable pins 120 at a time. As movable pins 120 engage raised actuators 117 positioned on write head 115, the first end of movable pins 120 engaging raised actuators 117 may be raised to correspond to the raised dots of a desired braille character.

Therefore, write head 115 may be configured to engage a single module of movable pins 120 representing a braille character without engaging another module of movable pins 120 representing a second braille character. To this end, write head 115 and the modules of movable pins 120 may be dynamically refreshed or updated without a second module being altered by a single write head 115, wherein the write head 115 may both write and reset the modules of movable pins 120.

As depicted in FIG. 12, four of the six pins within a module of movable pins 120 are in the raised position, forming the braille character corresponding to the letter Z.

Figure 13:
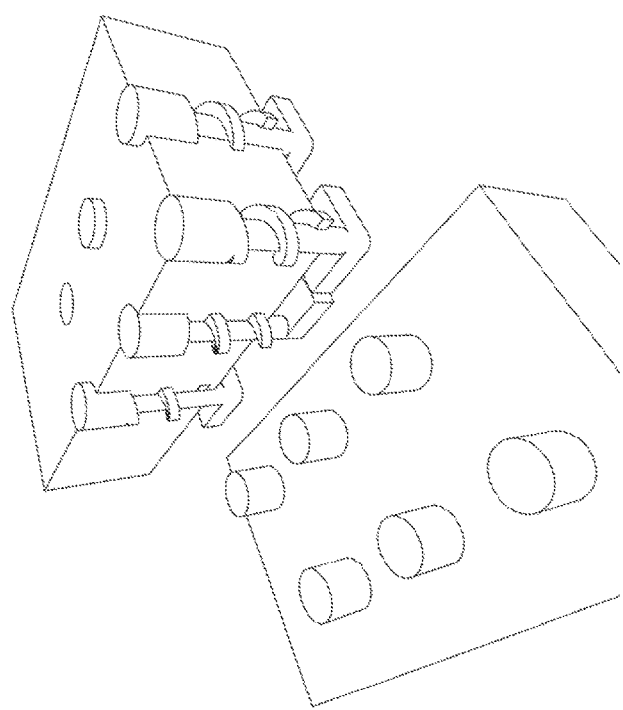
FIG. 13 depicts an embodiment of a perspective view of a plurality of movable pins projecting away from a display substrate to form a braille character.

FIG. 13 depicts one embodiment of a second perspective view of FIG. 12.

Figure 14:
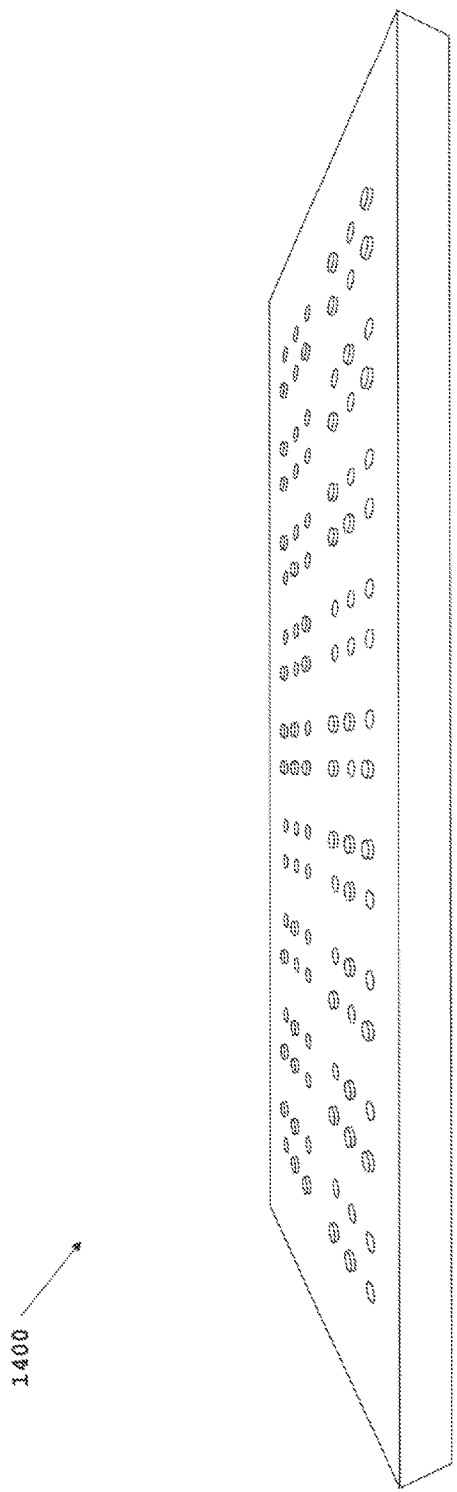
FIG. 14 depicts an embodiment of a display substrate with eighteen modules of movable pins.

FIG. 14 depicts one embodiment of a display substrate 1400 with eighteen modules of movable pins. The eighteen modules of movable pins may be positioned to represent the spelling of "THE QUICK BROWN FOX" in braille. The eighteen modules may be positioned in two rows with each row having nine columns, and each module having six movable pins. A six actuator write head (not shown) may be configured to set all of the movable pins in display substrate 1400 in two linear passes. One skilled in the art may appreciate that display module 1400 may be configured to have any number of modules of movable pins, which may be positioned in any number of rows.

Figure 15:
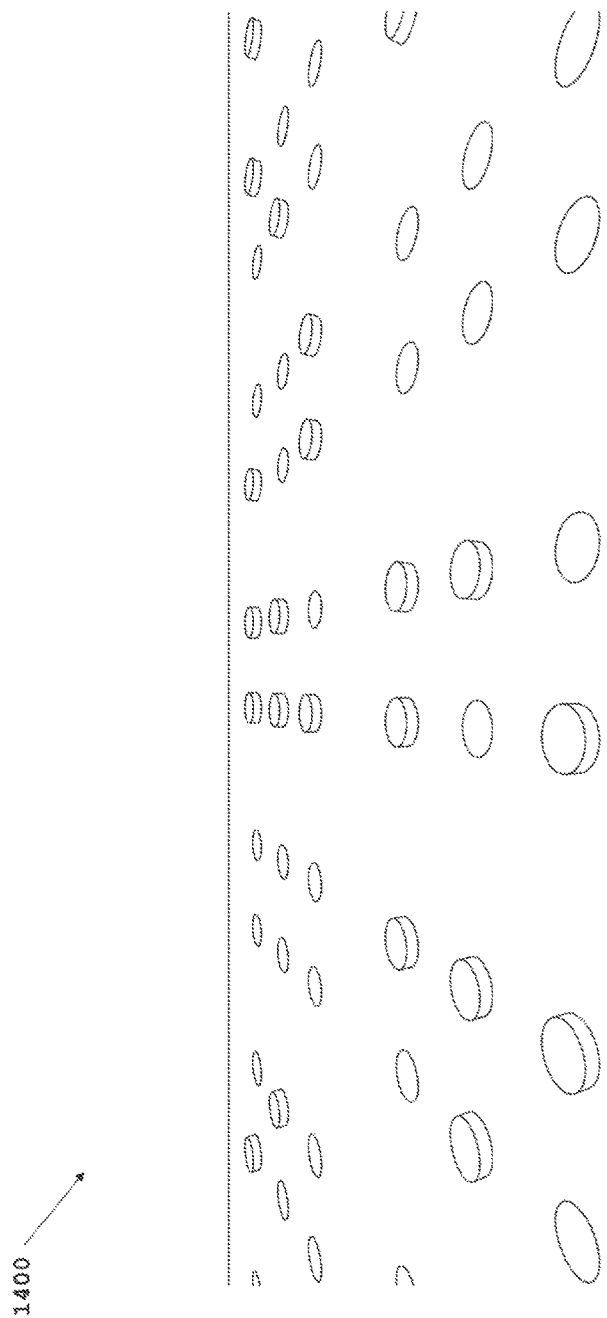
FIG. 15 depicts an embodiment of a plurality of modules of movable pins within a display substrate.

FIG. 15 depicts a detail view of one embodiment of FIG. 14 with a plurality of modules of movable pins within display substrate 1400.

Figure 16:
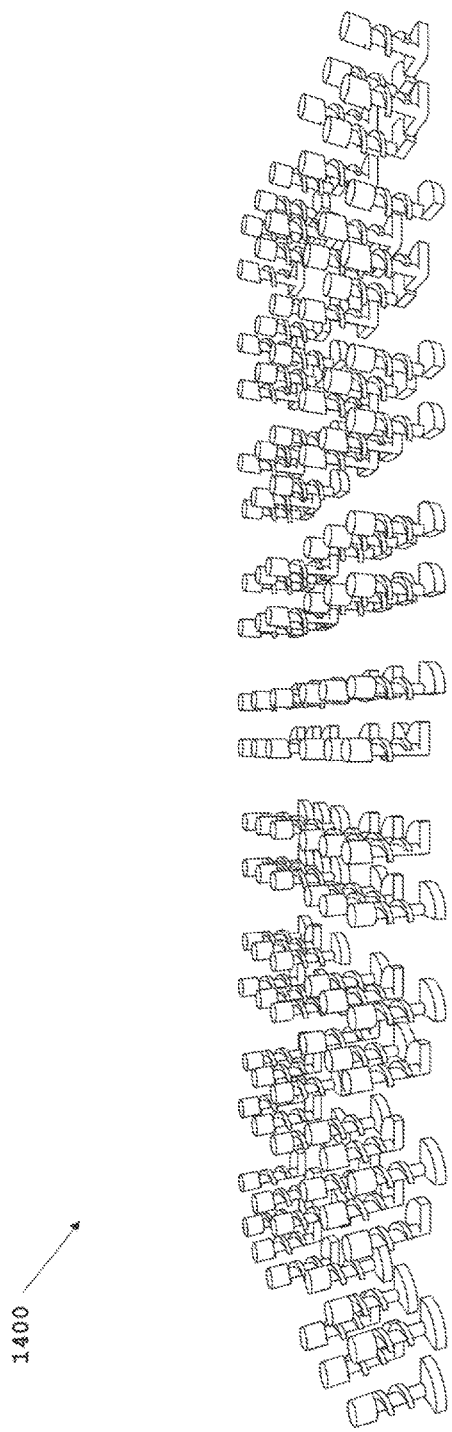
FIG. 16 depicts an embodiment of a plurality of modules of movable pins within a hidden display substrate.

FIG. 16 depicts a view of one embodiment of FIG. 14 with a plurality of modules of movable pins within hidden display substrate 1400.

Figure 17:
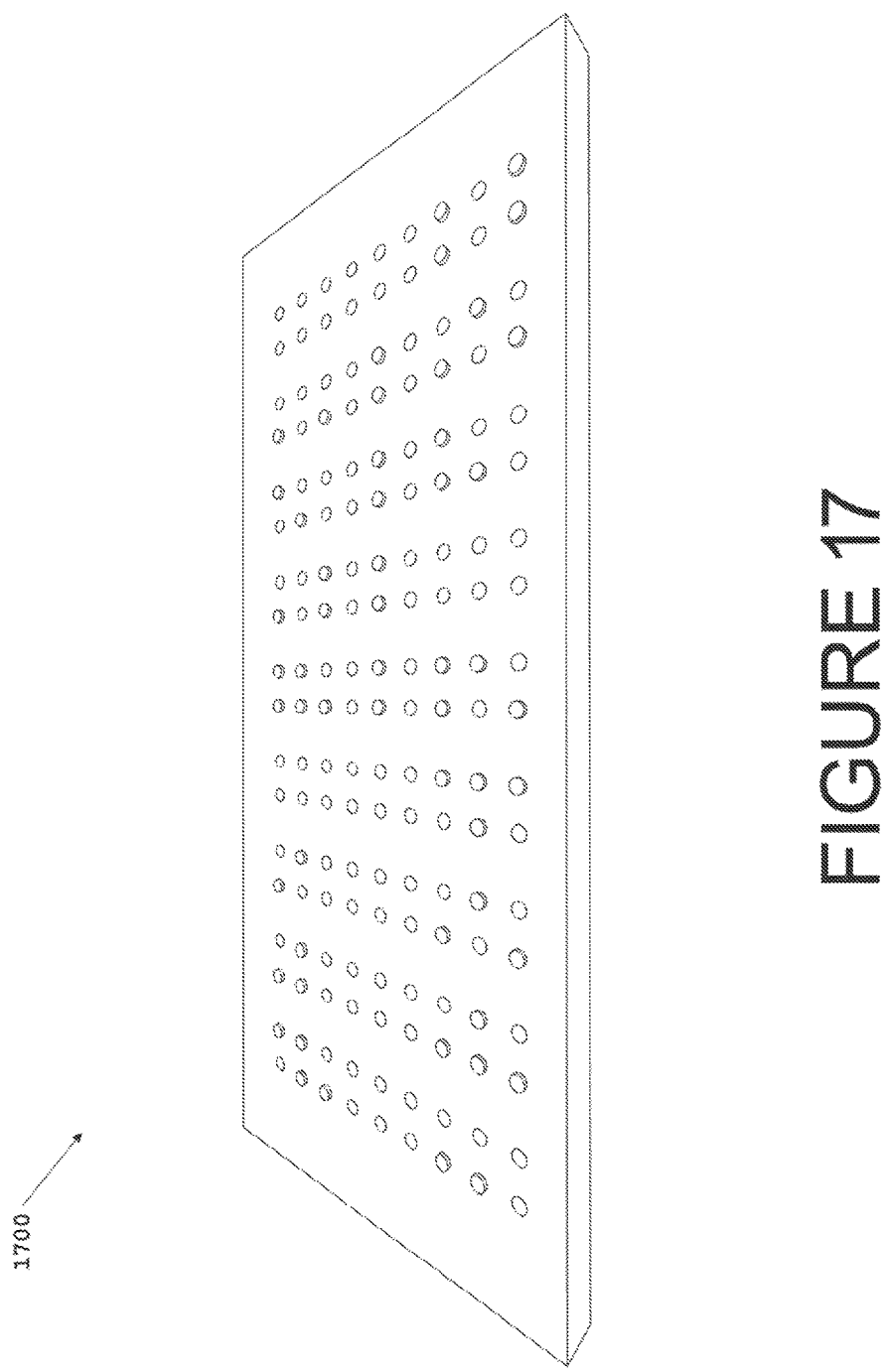
FIG. 17 depicts an embodiment of a multi-line display substrate configured to provide annotation.

FIG. 17 depicts one embodiment of a multi-line display substrate 1700 configured to provide annotation. Display substrate 1700 may include three rows of modules of movable pins, wherein the rows of modules may be configured to provide annotations of other rows of modules based on the positioning of the movable pins within the modules located within the annotated row of modules.

In FIG. 17, the word QUIK may be misspelled, and the misspelled word may be underlined. In embodiments, the misspelled word may be underlined by using an extended line of movable pins, wherein the extended line extends past the surface of display substrate 1700 under a misspelled word to indicate a misspelled word.

In embodiments, the movable pins may be uniformly spaced along vertical lines, with a row of pins in the lowered positioned being used to separate lines of characters. The annotation, the underline to indicate a misspelled word, may efficiently use display substrate 1700 by modifying the line spacing to accommodate the underlining.

Figure 18:
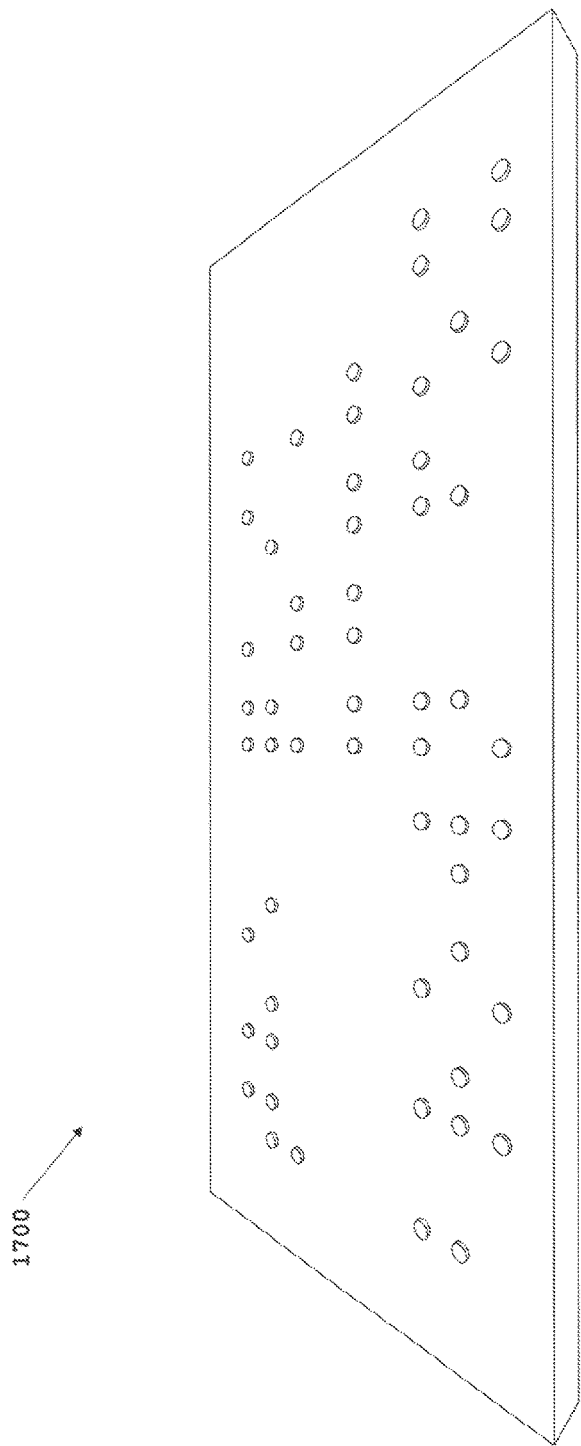
FIG. 18 depicts an embodiment of a display substrate with the lowered pins being hidden for clarity.

FIG. 18 depicts display substrate 1700 with the lowered pins being hidden for clarity of explanation of FIG. 17 according to one embodiment.

Figure 19:
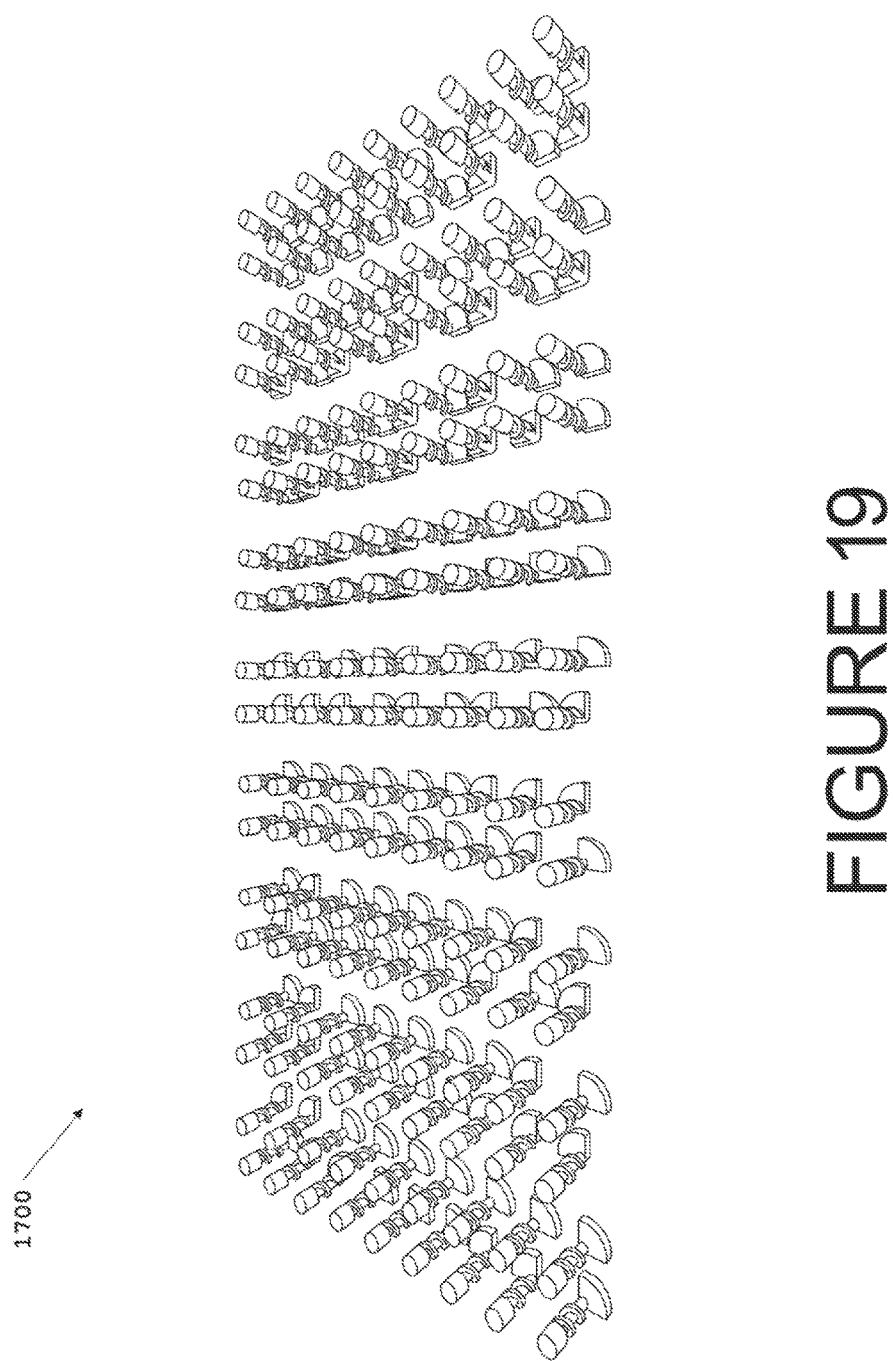
FIG. 19 depicts an embodiment of a display substrate with the display substrate being hidden to show the arrangement of the movable pins.

FIG. 19 depicts display substrate 1700 with the display substrate being hidden to show the arrangement of the movable pins according to one embodiment.

Figure 20:
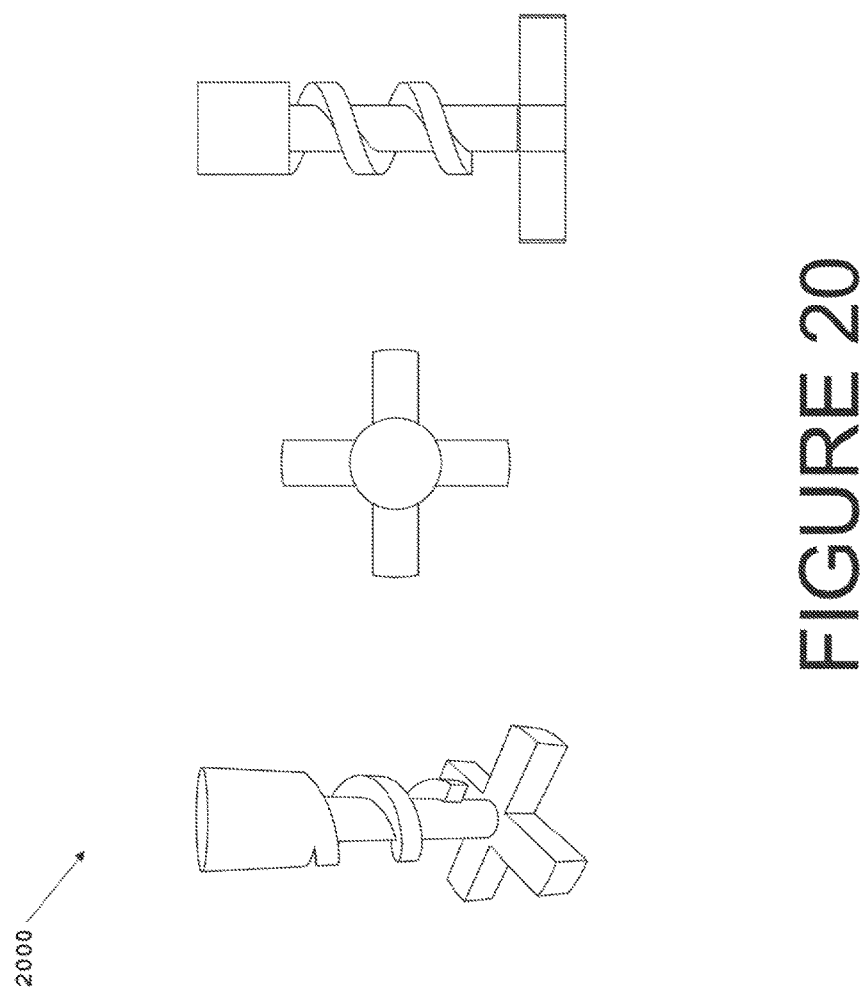
FIG. 20 depicts an embodiment of a movable pin with a second end designed to be engaged by the actuators of the write head so as to provide an alternative extended rotation about its axis and therefore an alternative extended projection away from the display substrate.

FIG. 20 depicts one embodiment of a movable pin 2000 with a second end with a cam that is configured to engage with an actuator of a write head to achieve greater rotation in a single pass of the write head.

The cam design of the second end of movable pin 2000 may be configured to enable a write head with, for example, two independent actuators on a common line of motion, to engage with the cam of movable pin 2000 to engage with one actuator or both actuators, raising the movable pin 2000 to the standard raised position or to a second, higher raised position above the substrate surface. The braille dots that are raised to a greater degree may be employed for tactile emphasis of selected display elements, such as an individual word, a page title, non-character lines separating the cells of a spreadsheet, lines demarcating portions of a document, or lines dividing the display into regions of independent content.

In embodiments, the movable pin 2000 may be configured to use a helical motion within the display substrate. The shape of the helix (torsion vs. curvature) may be chosen to provide the required degree of protrusion of the first end of movable pin 2000 that is configured to extend past the surface of a display substrate.

The two geometrically degenerate helical shapes, "zero torsion" and "zero curvature," may be configured to provide possible paths of movable pin 2000 through the display substrate. In embodiments, movable pin 2000 may be configured with a zero torsion helix, making the movable pin path circular.

Figure 21:
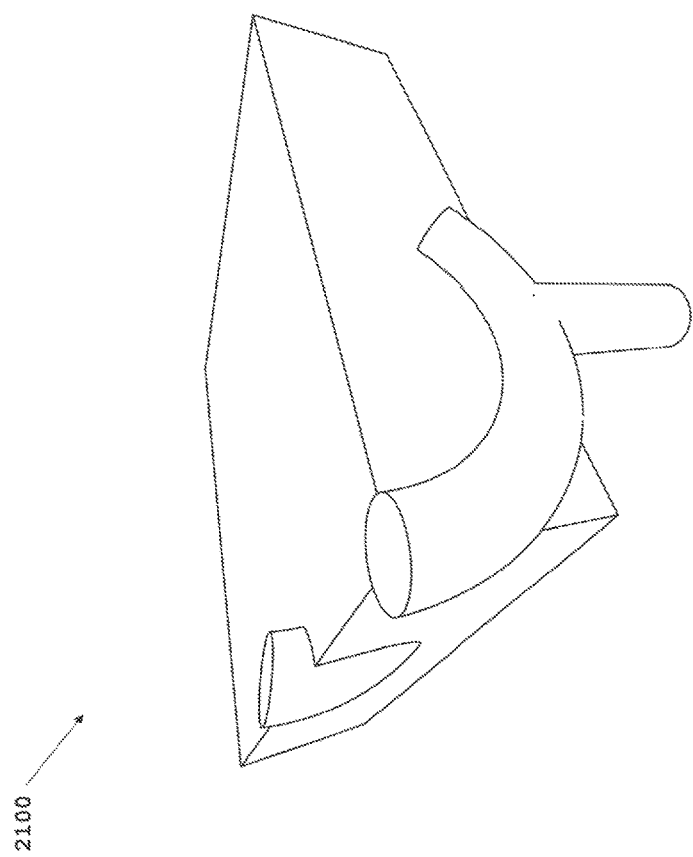
FIG. 21 depicts an embodiment of a movable pin that is configured to move in a circular path

FIG. 21 depicts one embodiment of a movable pin 2100 that is configured to move in a circular path. Movable pin 2100 may be configured to receive force from a write head on the cam portion of movable pin 2100 that protrudes downward. The received force may be configured to be utilized to rotate movable pin 2100 causing the first end of movable pin 2100 to change position from protruding beyond the surface of the display substrate to being flush with the surface of the display substrate, or vice versa.

Figure 22:
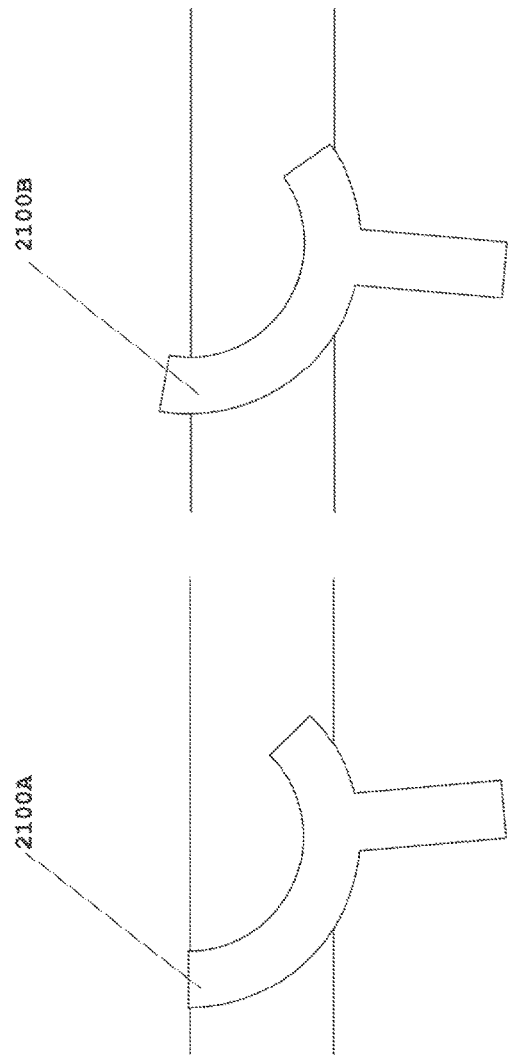
FIG. 22 depicts an embodiment of movable pins configured to move in a circular path.

FIG. 22 depicts one embodiment of movable pins 2100, where movable pin 2100A is in the lowered position and movable pin 2100B is in the raised position.

Figure 23:
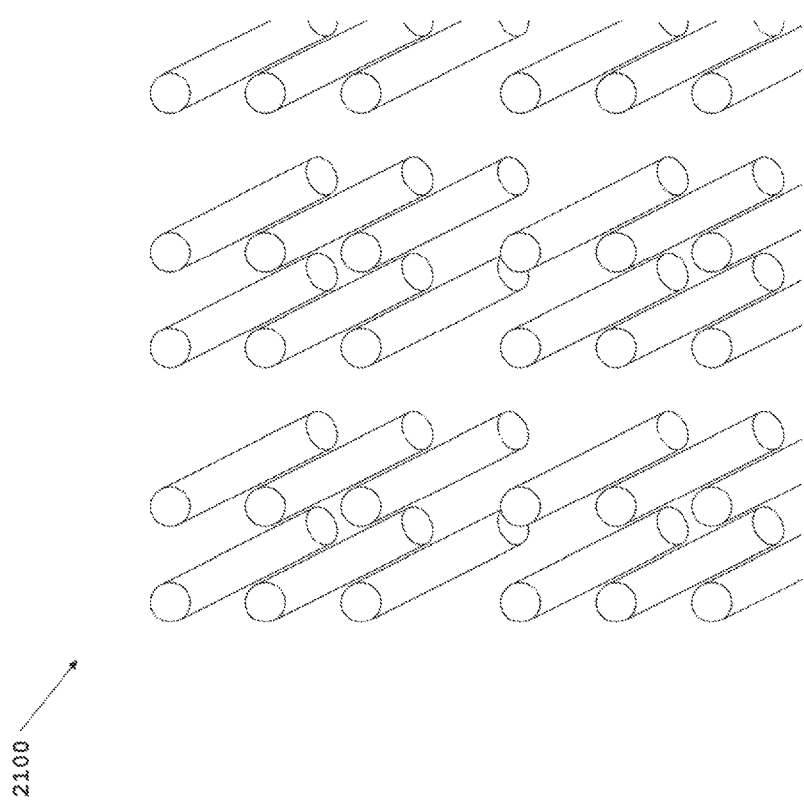
FIG. 23 depicts a top view of an embodiment of movable pins configured to move in a circular path while embedded in a display substrate.

FIG. 23 is a top view of movable pins 2100 configured to move in a circular path while embedded in a display substrate. Movable pins 2100 may be grouped to form six dot braille characters.

Figure 24:
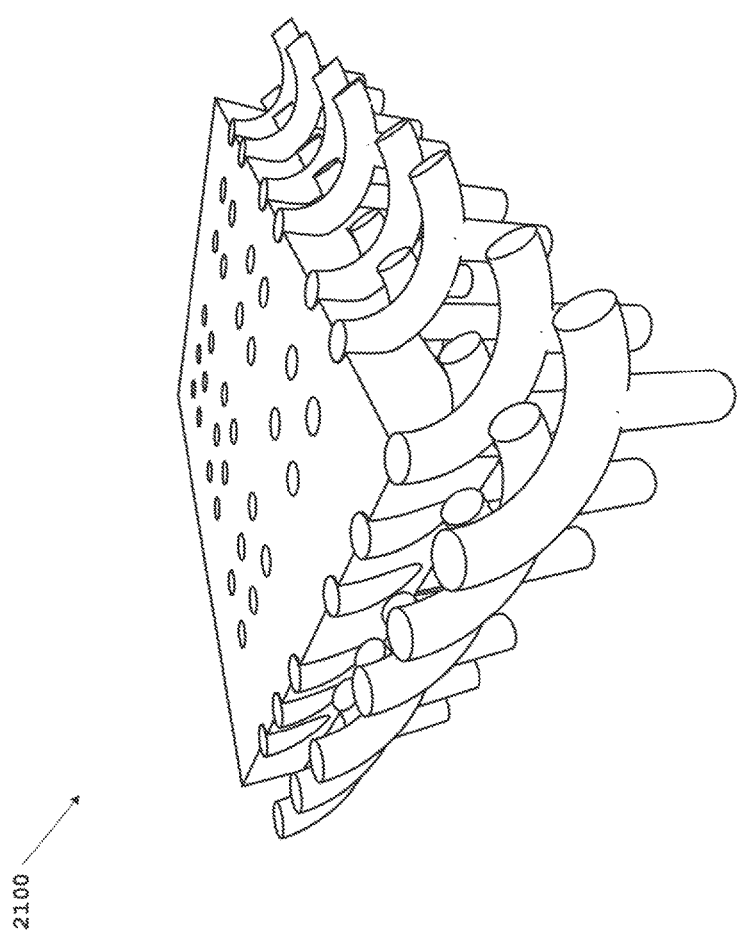
FIG. 24 depicts an embodiment of a perspective view of a cross-section of movable pins configured to move in a circular path.

FIG. 24 is one embodiment of a perspective view of a cross-section of the movable pins 2100 depicted in FIG. 23. The angular offset applied to the movable pins may allow for non-interfering arrays of movable pins, either with uniform spacing in one or both dimensions, or grouped to facilitate display of braille characters.

Figure 25:
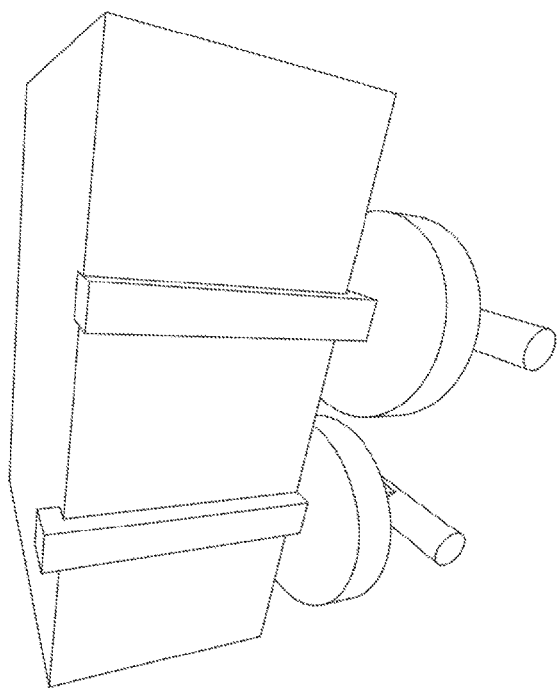
FIG. 25 depicts a perspective view of an embodiment of a movable pin with geometry that constrains the pin motion in a zero curvature helical path within a display substrate.
Figure 26:
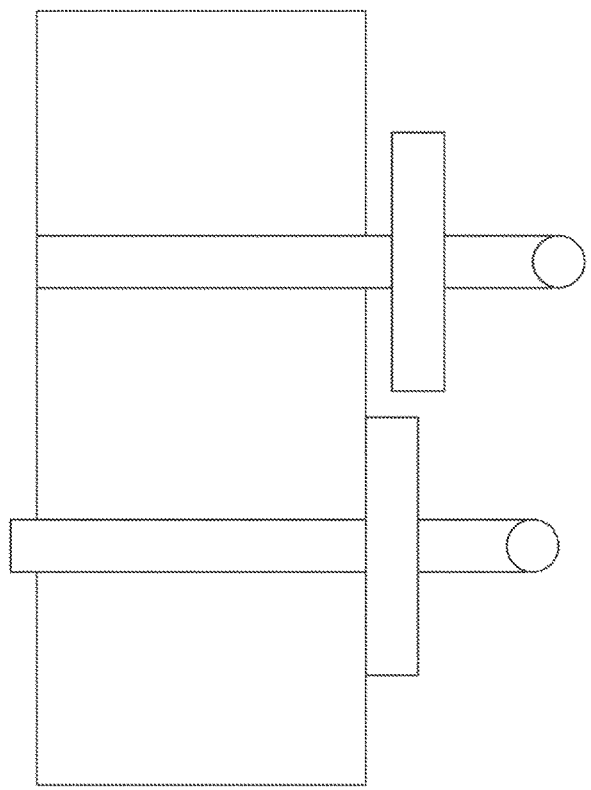
FIG. 26 depicts an embodiment of a movable pin with geometry that constrains the pin motion in a zero curvature helical path within a display substrate.
Figure 27:
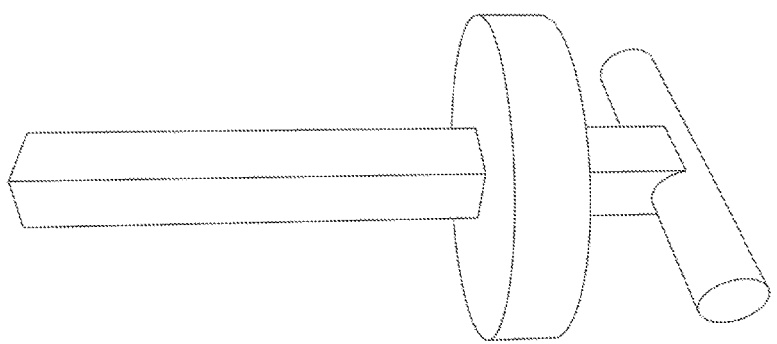
FIG. 27 depicts an embodiment of a movable pin with geometry that constrains the pin motion in a zero curvature helical path.

FIGS. 25-27 depict embodiments of a movable pin with geometry that constrains the pin motion in a zero curvature helical path, such as a straight line. The movable pin may include a uniform cross section, and a write head may exert a force perpendicular to the display surface to move the pin up and down. In embodiments, the cam at the second end of the movable pin may engage with the write head, which provides a force to move the pin vertically up or down.

One skilled in the art will appreciate that the movable pins may be comprised of various shapes and/or sizes, and may be configured to engage with a write head in various ways. Accordingly, the choice of material, geometry, surface finish, or coatings of the movable pins and/or the display substrate may be determine by the mechanical requirements for friction between the movable pins and the display substrate, device durability, user comfort and user appeal, materials and manufacturing costs, etc.

Figure 28:
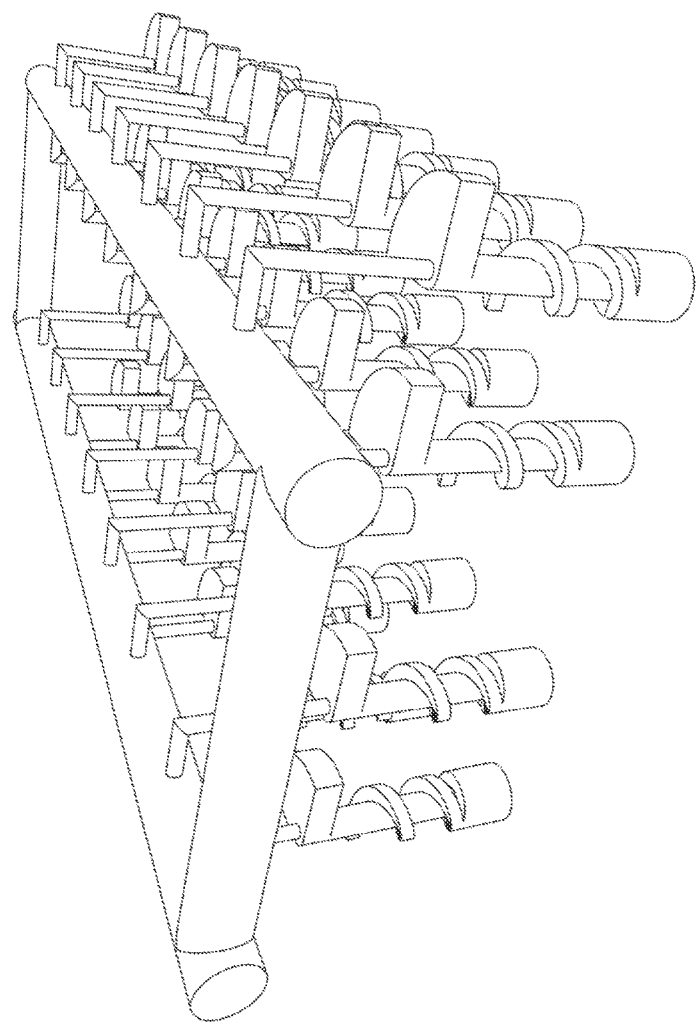
FIG. 28 depicts an embodiment of a manufacturing technique that produces large numbers of accurately aligned pins connected by sprues.

FIG. 28 depicts one embodiment of a method of manufacturing the moveable pins and the display substrate that facilitates a low cost of production. As depicted in FIG. 28 multiple movable pins are coupled by sprues. The sprues may be temporary structures that serve to facilitate the production of multiple movable pins as a single part, in a single manufacturing operation. For example, the single manufacturing operation may use additive manufacture methods or micro metal powder injection molding.

Figure 29:
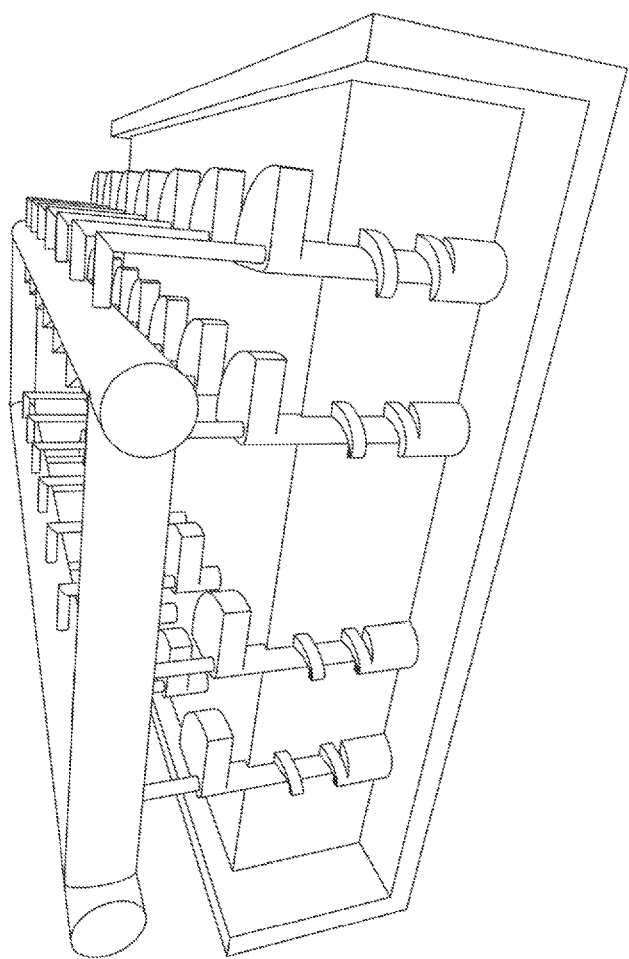
FIG. 29 depicts an embodiment of a manufacturing technique that embeds the pins within the substrate while the pins remain connected by sprues.

FIG. 29 depicts one embodiment of a cross section of multiple pins connected by sprues in an insert mold operation. In the insert mold operation, the movable pins may be coupled by sprues that are positioned with a mold, and the display substrate material may be introduced into the mold as a fluid. The fluid may conform to the shape of both the mold and the movable pins. When the display substrate material has solidified, the display substrate with the movable pins being correctly positioned is removed from the mold, and the sprues are trimmed from the movable pins.

To this end, a large array of movable pins that are embedded in a display substrate may be produced with a small number of manufacturing steps. The manufacturing steps may be made to include as few as two molding steps, with the first molding step being molding the pin array as single piece connected by sprues, and the second molding step being insert molding of the display substrate to embed the movable pins.

Figure 30:
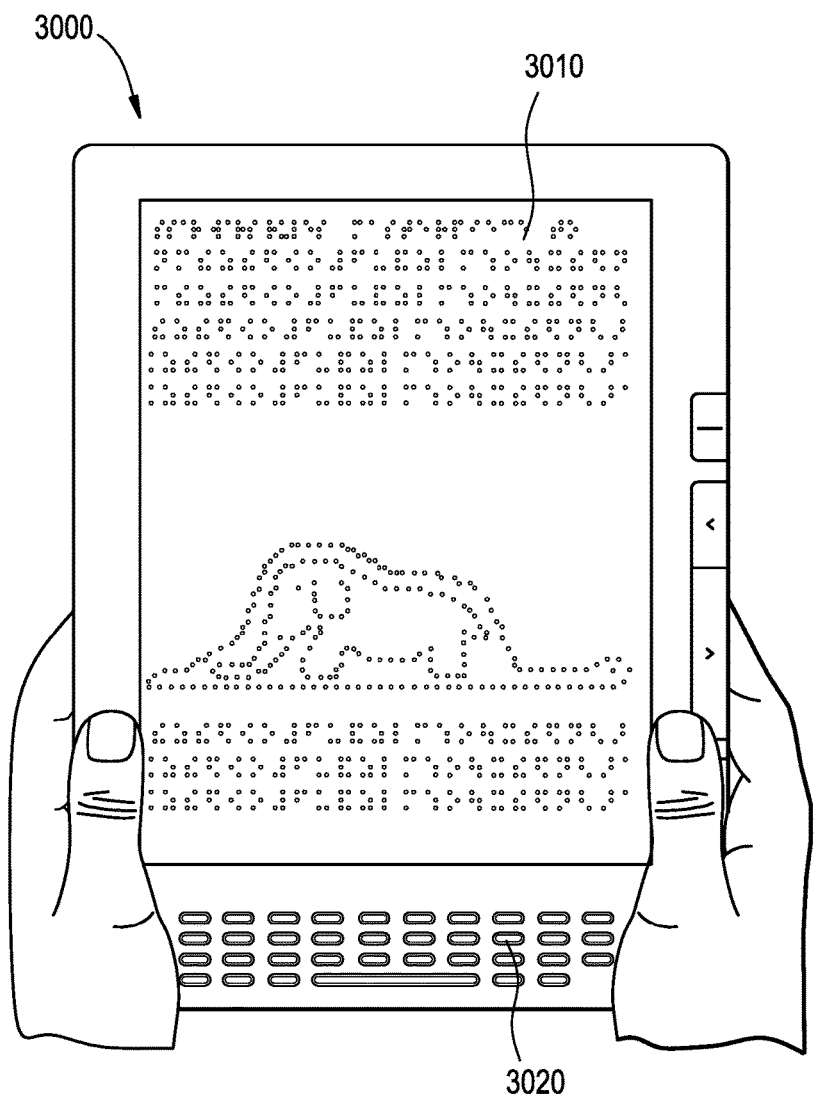
FIG. 30 depicts an embodiment of a multi-line display substrate presented as a tablet computer.

FIG. 30 depicts one embodiment of a tactile braille display 3000 presented as a tablet computer. In embodiments, tactile braille display 3000 may be implemented in various manners, including: a smart phone, tablet computer, laptop computer, wearable computer, personal data assistant, or any other type of mobile device with a hardware processor that is configured to process instructions and connect to network. Tactile braille display 3000 may be configured to be implemented along with conventional computing systems. Tactile braille display 3000 may include display 3010 and user interface 3020. The display 3010 may be configured to dynamically change based on the information presented on the display. While one user interface 3020 is shown, the term "user interface" may include, but is not limited to being, a touch screen, a physical keyboard, a mouse, a camera, a video camera, a microphone, and/or a speaker. A user may use the user interface 3020 to edit, view, change, modify, etc. the information presented on tactile braille display 3000.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s).

What is claimed is:

1. A tactile braille display comprising:
a display substrate with a planar top surface;
a plurality of movable pins configured to be positioned within the display substrate, and the plurality of movable pins being configured to move between a first position and a second position, each of the plurality of movable pins including a first end, a shaft, and a second end,
the first end being configured to provide a raised dot of a braille character when the movable pin is in the second position, wherein in the second position the first end is positioned above the planar top surface,
the shaft being configured to secure the movable pin within the display substrate and move in a helical path within the display substrate,
the second end including a cam, wherein the plurality of movable pins includes a first movable pin;
a write head configured to interface with the plurality of movable pins, the write head including a first actuator and a second actuator, the first actuator being configured to be in an extended positioned to engage with the cam of the first movable pin when the first movable pin is in the first position, and the second actuator being configured to in the extended position to engage with the cam of the first movable pin when the first movable pin is in the second position, wherein the write head is configured to move in a direction that is parallel to the planar top surface of the display substrate.

2. The tactile braille display of claim 1, wherein in the first position the first end is positioned coplanar with the planar top surface of the display substrate.

3. The tactile braille display of claim 1, wherein the first actuator is configured to rotate the cam of the first movable pin in a first direction to move the first movable pin from the first position to the second position.

4. The tactile braille display of claim 3, wherein the second actuator is configured to rotate the cam of the first movable pin in a second direction to move the first movable pin from the second position to the first position.

5. The system of claim 1, wherein the first actuator is a retractable actuator configured to be extended or retracted to move the movable pin, and the second actuator is secured in a fixed position on the write head.

6. The tactile braille display of claim 1,
wherein the plurality of movable pins are configured to represent a single braille character, wherein each of the plurality of movable pins is configured to independently move between the first position and the second position.

7. The tactile braille display of claim 6, comprising:
a plurality of braille modules, wherein the plurality of movable pins within a first of the plurality of braille modules are configured to be moved independently of the plurality of movable pins within a second of the plurality of braille modules.

8. The tactile braille display of claim 7, wherein the write head is configured to interface with the plurality of movable pins within the first braille module before interfacing with the plurality of movable pins within the second braille module.

9. A method utilizing a tactile braille display comprising:
embedding a plurality of movable pins within a display substrate, the display substrate including a planar top surface, the plurality of movable pins including a first movable pin;
moving the plurality of movable pins between a first position and a second position within the display substrate via a write head, the display substrate having a planar top surface;
interfacing a first actuator positioned within the write head with a cam positioned on a second end of the first movable pin when the first movable pin is in the first position, wherein the write head is configured to move in a direction that is within a plane parallel to the planar top surface of the display substrate;
interfacing a second actuator positioned within a write head with the cam positioned on the second end of the first movable pin when the first movable pin is in the second position.

10. The method of claim 9, wherein in the first position the first end is positioned coplanar with the planar top surface of the display substrate.

11. The method of claim 9, comprising:
rotating, via the first actuator, the cam of the first movable pin in a first direction to move the first movable pin from the first position to the second position.

12. The method of claim 11, comprising:
rotating, via the second actuator, the cam of the first movable pin in a second direction to move the first movable pin from the second position to the first position.

13. The method of claim 9, comprising:
retracting or extending the first actuator;
fixing the second actuator in the raised position.

14. The method of claim 9, comprising:
representing a single braille character with a first set the plurality of movable
independently moving each of the plurality of movable pins within the first set between the first position and the second position.

15. The method of claim 14, comprising:
moving the first set of the plurality movable pins independently from a second set of the plurality movable pins.

16. The method of claim 15, comprising:
interfacing, via the write head, the first set of movable pins before the write head interfaces with the second set of movable pins.

* * * * *